Jan. 22, 1963 V. FLAX 3,074,837
METHOD FOR SEALING THERMOPLASTIC TUBING
Filed May 23, 1957
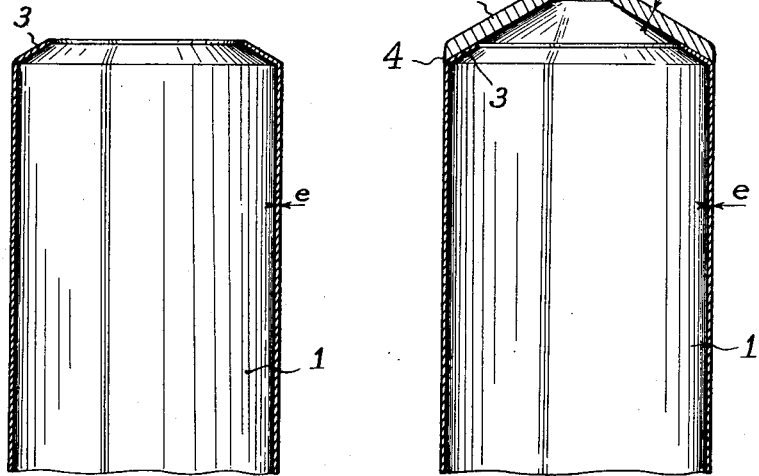
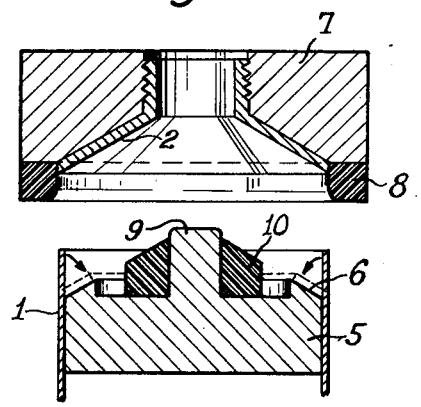

3,074,837
METHOD FOR SEALING THERMOPLASTIC TUBING
Valer Flax, Vic-Fezensac (Gers), France
Filed May 23, 1957, Ser. No. 661,260
Claims priority, application France May 26, 1956
1 Claim. (Cl. 156—69)

This invention relates to a method of sealing a rigid end piece to tubing. The invention has a special applicability to thermoplastic tubing elements serving as dispensing containers for various compositions in paste form, such as toothpaste, food products and the like.

An object of the invention is to provide an improved method for sealing a rigid end piece, e.g. a nozzle, to a thermoplastic tube in an inexpensive, reliable and attractive manner. Further objects will appear hereinafter.

Dispensing tube containers of the kind contemplated herein have sometimes been constructed in unitary form, that is with the tubular body and dispensing nozzle thereof made of an integral thermoplastic element. This, however, leads to excessive stiffness of the tubular body which becomes difficult to squeeze for dispensing the contents.

In order for it to be possible to use sufficiently yielding material for the body, it is necessary to bond to the body a separate end piece or nozzle made of a more rigid material. Various methods have been used for this purpose. In one method, a plurality of angularly spaced lugs are stamped out of the tubular body near the end thereof to be sealed, and said lugs are pressed outwards and the periphery of the rigid end piece is then bonded thereto. In other techniques, the tube periphery is folded externally over the periphery of the end piece and bonded thereto. In yet other instances, the tube periphery cooperates with a shoulder or groove formed in the endpiece. None of these methods is entirely satisfactory in practice, since the manufacturing procedure is complicated thereby, the bond is more or less unreliable, and the appearance of the finished tube is unattractive.

In accordance with the invention, a continuous flange is formed at the end of the tubular body by simultaneously bending the end of said body inwards simultaneously throughout its whole periphery, and the end piece to said flange, by application of heat and pressure.

Preferably in practice the continuous flange is formed while the tube is in position around a mandrel, the mandrel being appropriately shaped at its end so as to serve as a guide, or backing surface, for said flange during the inward folding of the latter. A rigid end piece is bonded to the flange by the action of an additional cooperating member formed with an insulating annulus or flange adapted to mate with the periphery of the end piece around the flange of the tube, while a central insulating ring prevents collapse of the corresponding area of the end piece.

A clear understanding of the invention will be gained from the ensuing exemplary description with reference to the drawings wherein:

FIG. 1 illustrates a section of tubing shaped to receive a seal in accordance with the invention;

FIG. 2 shows the section of tubing with a nozzle element bonded to it; and

FIG. 3 illustrates in section a form of apparatus used for performing the method of the invention.

As shown, a tubing element partly illustrated at 1 may be made from thin flexible, thermoplastic sheet material, such as transparent polyvinyl chloride, having a comparatively small thickness dimension $e$. In accordance with the invention, an end piece 2 is employed which is of substantially rigid construction and which may comprise a molding from the same material as the tube but having a wall thickness $E$ substantially greater, e.g. 3 to 5 times greater, than the thickness $e$ of the tube element 1. To bond the endpiece 2 to the tubular body 1, the end periphery of the body 1 is flanged inwardly as shown at 3 by simultaneously deforming the body throughout its periphery by a combined, controlled application of heat and pressure, preferably in a manner to be later described. It is important that the heating be carefully controlled, the heat being applied a time just sufficient to permit the mechanical deformation to the extent required. Thus, in connection with polyvinyl chloride, the end of the tube 1 is heated about 15° C. above ambient temperature so that on cooling it retains the deformation imparted to it. It is noted that the extent and duration of the heat treatment will depend on the nature and characteristics of the material used. In fact with some thermosettable materials it will be actually necessary to apply cooling rather than heating.

An important feature of the invention resides in the fact that the tube 1, positioned around the forming mandrel 5 on which it is pressure molded, is heated so rapidly that it is softened to the necessary extent to permit shaping the flange thereon while the mandrel itself is not substantially heated due to its greater mass.

After the flange 3 has been formed the endpiece 2 is bonded thereto externally on said flange, as by a further application of heat and pressure, so that the periphery of the endpiece lies flush with the cylindrical outer surface of the tube body 1.

FIG. 3 illustrates one form of apparatus for carrying out the method of the invention. There is provided a mandrel or core 5 made of conductive material and having a frustoconical marginal end surface 6 and a central shank or stem 9. The end portion 3 of the tubular body 1 when in place around the core 5 is applied inwards against the surface 6 by mechanical pressure applied simultaneously around the whole periphery of the tube by any suitable pressure means, as by inflating an inflatable annulus arranged for cooperation with the frustoconical surface 6.

The endpiece 2 is thereafter applied by means of a capping mold section 7 adapted to be fitted over the top of the core 5 and including an insulating skirt portion 8 arranged to surround in close fitting relation the periphery of the endpiece while a further insulating ring 10 is placed around the axial stem 9 of the core, said ring including a frustoconical surface for defining the internal surface of the endpiece and preventing the collapse thereof. The arrangement shown prevents any distortion and flow of the material of the endpiece on application of the bonding heat and pressure.

The endpiece instead of having a centrally apertured nozzle as shown may be provided with a flat solid wall instead. Yet other variations in the subject matter shown and described may be made within the scope of the invention.

What I claim is:

A method of preparing a tubular dispensing device with a rigid end piece comprising pre-forming said end piece with a conical flange and of a heat sealable plastic, said end piece being formed with a specific outer diameter, forming a tube of substantially the same diameter as said end piece and of relatively flexible heat-sealable plastic, deforming one end of said tube on a mandrel having a conical shape corresponding to that of said flange and applying heat and pressure simultaneously around the whole of said end, said end being deformed into a conical flange having a lesser extent than the conical flange of the end piece, and bringing the flange of the end piece against the outside of the flange of the deformed tube end on said mandrel so that the flanges are in face-to-face relation, with the flange of the tube extending partly along the flange of said end piece, supporting the flange of the end piece with a support of heat insulating material, and heating said mandrel to heat seal said flanges together.

References Cited in the file of this patent

UNITED STATES PATENTS

| | | |
|---|---|---|
| 1,754,496 | Barker | Apr. 15, 1930 |
| 2,129,839 | Henderson | Sept. 13, 1938 |
| 2,219,576 | Moreland | Oct. 29, 1940 |
| 2,282,423 | Kopitke | May 12, 1942 |
| 2,386,498 | Ostrander | Oct. 9, 1945 |
| 2,413,323 | Hills | Dec. 31, 1946 |
| 2,476,446 | Lindell | July 19, 1949 |
| 2,644,198 | Crawford | July 7, 1953 |
| 2,713,369 | Strahm | July 19, 1955 |
| 2,751,319 | Carlson | June 19, 1956 |

FOREIGN PATENTS

| | | |
|---|---|---|
| 141,443 | Australia | June 4, 1951 |